(12) United States Patent
Ekanayake et al.

(10) Patent No.: US 11,921,661 B2
(45) Date of Patent: Mar. 5, 2024

(54) STAND WITH DUAL PURPOSE RJ12 INTERFACE

(71) Applicant: Elo Touch Solutions, Inc., Milpitas, CA (US)

(72) Inventors: Asela Ekanayake, Reno, NV (US); Lyder Wang, Taipei (TW); Fareed Uddin, San Jose, CA (US)

(73) Assignee: Elo Touch Solutions, Inc., Knoxville, TN (US)

( * ) Notice: Subject to any disclaimer, the term of this patent is extended or adjusted under 35 U.S.C. 154(b) by 0 days.

(21) Appl. No.: 17/679,738

(22) Filed: Feb. 24, 2022

(65) Prior Publication Data
US 2023/0267088 A1    Aug. 24, 2023

(51) Int. Cl.
*G06F 13/42*    (2006.01)
*G06F 13/38*    (2006.01)
*G07G 1/00*    (2006.01)
*G06F 3/14*    (2006.01)

(52) U.S. Cl.
CPC ........ *G06F 13/382* (2013.01); *G06F 13/4282* (2013.01); *G07G 1/0027* (2013.01); *G06F 3/14* (2013.01)

(58) Field of Classification Search
None
See application file for complete search history.

(56) References Cited

U.S. PATENT DOCUMENTS

| | | | |
|---|---|---|---|
| 11,238,002 B1* | 2/2022 | Sachs | G06F 13/4282 |
| 11,257,057 B1* | 2/2022 | Asmi | G07G 1/01 |
| 2014/0279116 A1* | 9/2014 | Vasquez | G06Q 20/3227 705/21 |
| 2020/0058008 A1* | 2/2020 | Hicks | G06K 7/0004 |
| 2021/0248099 A1* | 8/2021 | Hasegawa | G06F 1/1626 |

\* cited by examiner

*Primary Examiner* — Henry Tsai
*Assistant Examiner* — Dean Phan
(74) *Attorney, Agent, or Firm* — Sterne, Kessler, Goldstein & Fox P.L.L.C.

(57) ABSTRACT

Some embodiments include a stand that includes a communication interface, a universal serial bus (USB) microcontroller, and one dual purpose RJ12 interface configured to switch between a cash drawer mode and an RS232 mode. The stand can be configured to be coupled to a main display device. The main display device (e.g., an application running on the main display device) can enable selection of the cash drawer mode for communications via the dual purpose RJ12 interface, and receive an input signal after the selection. The main display device can enable selection of the RS232 mode for communications via the dual purpose RJ12 interface based on the input signal and transmit an indication to the stand, where the dual purpose RJ12 interface is configured to operate in the RS232 mode. The stand can include a hinge structure that enables the main display device to be flipped to face an opposite direction.

20 Claims, 12 Drawing Sheets

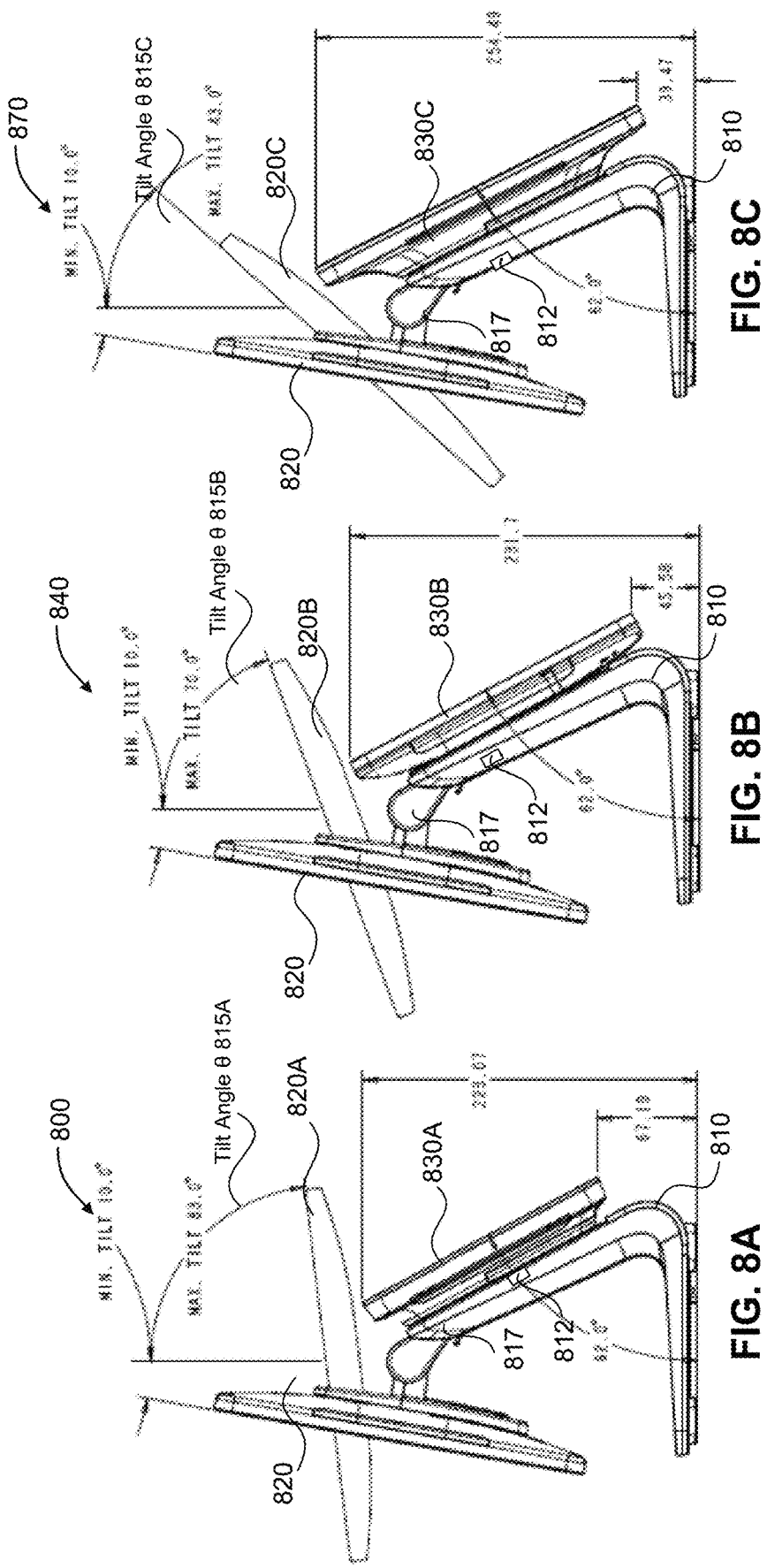

STAND WITH DUAL PURPOSE RJ12 INTERFACE

BACKGROUND

Field

The present disclosure relates generally to stand device, and more specifically to a stand hub device with a dual purpose RJ12 interface.

Background Art

The ability to interact with computer applications via touch with displays is ubiquitous for today's consumers. Touch screen devices may be placed on a stand for ease of use.

SUMMARY

System, method, combination, sub-combination and other embodiments are provided for a stand with a dual purpose RJ12 interface. The stand can include a communication interface, a universal serial bus (USB) microcontroller coupled to the communication interface, and one dual purpose RJ12 interface configured to be used with a cash drawer device or an RS232 device. The stand can be configured to be coupled to a main display device that can select the cash drawer mode for communications via the dual purpose RJ12 interface. After the selection the main display device can receive an input signal, select the RS232 mode for communications via the dual purpose RJ12 interface based on the input signal, and transmit an indication to the stand, where the dual purpose RJ12 interface is configured to operate in the RS232 mode. The main display device can receive the input (e.g., via a graphical user interface (GUI) or as a default setting).

In some embodiments, the stand includes a hinge structure that substantially conceals a USB cable and a power cable coupled to a main display device. In an example, the power cable or the USB cable is at least 12 inches (320 mm) long. In some examples, a length of the power cable or the USB cable varies according to a geometry of the main display device. Further, the hinge structure enables the main display device to be flipped to face an opposite direction. For example, the main display device be flipped to tilt at a tilt angle, θ, wherein θ is less than or equal to 152°. In some embodiments, the main display device and a customer facing device coupled to the stand face opposite directions. In an example, where the main display device and the customer facing device are of substantially equivalent sizes, the hinge structure enables the main display device to be tilted at a tilt angle, θ, where θ is less than or equal to 43°. In another example, where a display of the main display device is approximately 1.2 times that of a customer facing display of the customer facing device, the hinge structure enables the main display device to be tilted at a tilt angle, θ, wherein θ is less than or equal to 70°. In another example where a display of the main display device is approximately 1.6 times that of a customer facing display of the customer facing device, the hinge structure enables the main display device to be tilted at a tilt angle, θ, wherein θ is less than or equal to 83°. Further embodiments, features, and advantages of the present disclosure, as well as the structure and operation of the various embodiments of the present disclosure, are described in detail below with reference to the accompanying drawings.

BRIEF DESCRIPTION OF THE DRAWINGS/FIGURES

The accompanying drawings, which are incorporated herein and form part of the specification, illustrate the present disclosure and, together with the description, further serve to explain the principles of the disclosure and to enable a person skilled in the relevant art(s) to make and use the disclosure.

FIG. 8A illustrates a first example of a stand with a dual purpose RJ12 interface with a main display device and a first customer display device, according to an exemplary embodiment of the disclosure;

FIG. 8B illustrates a second example of a stand with a dual purpose RJ12 interface with a main display device and a second customer display device, according to an exemplary embodiment of the disclosure;

FIG. 8C illustrates a third example of a stand with a dual purpose RJ12 interface with a main display device and a third customer display device, according to an exemplary embodiment of the disclosure;

Figure 1B:
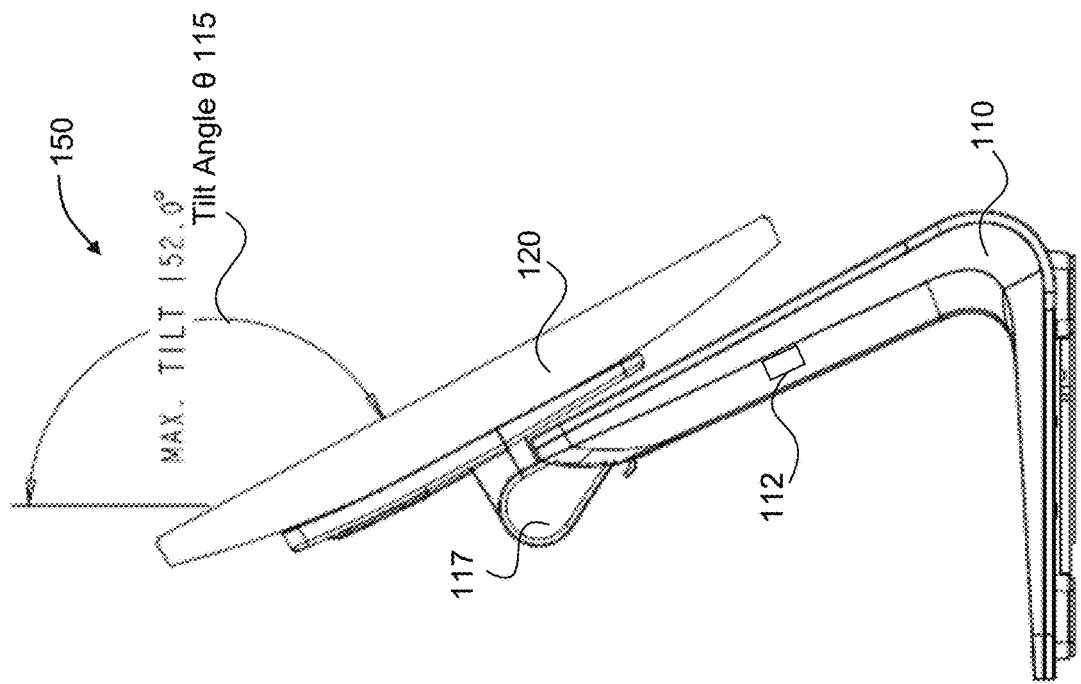
FIG. 1B illustrates a stand with a dual purpose RJ12 interface with a main display in a flipped configuration, according to an exemplary embodiment of the disclosure.

The present disclosure will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The following Detailed Description of the present disclosure refers to the accompanying drawings that illustrate exemplary embodiments consistent with this disclosure. The exemplary embodiments will fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein. Therefore, the detailed description is not meant to limit the present disclosure.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Touchscreen devices can be used with point of sale (POS) applications in a variety of environments. While stands that support a touchscreen device exist, some embodiments include a stand that enables a main display device to be inverted for customer viewing, and with a single dual purpose RJ12 interface usable with a cash drawer device or an RS232 device. The stand supports popular and commonly used interfaces, connectors, and/or ports in a compact, slim, and sleek structure. To support older devices that may include older and/or legacy applications, the stand supports a single dual purpose RJ12 interface. The popular and more commonly used interfaces can include (e.g., universal serial bus (USB)-A, USB-C, power, RJ45 interface (e.g., Ethernet connector), and/or lightning interface). Some examples of older or legacy devices can include but are not limited to applications that communicate with printers, bar code scanners, and/or system controllers for a display device (e.g., brightness, audio level, and on/off power). Including two or more RJ12 interfaces instead of a single dual purpose RJ12 interface would increase both cost and size (e.g., internal cables, additional electronics) of the stand or device with a hub. Accordingly, a single dual purpose RJ12 interface that supports older and/or legacy applications contributes to a more economical and compact design of a stand and/or device with a hub that also supports newer, popular, and/or commonly used interfaces.

Figure 1A:
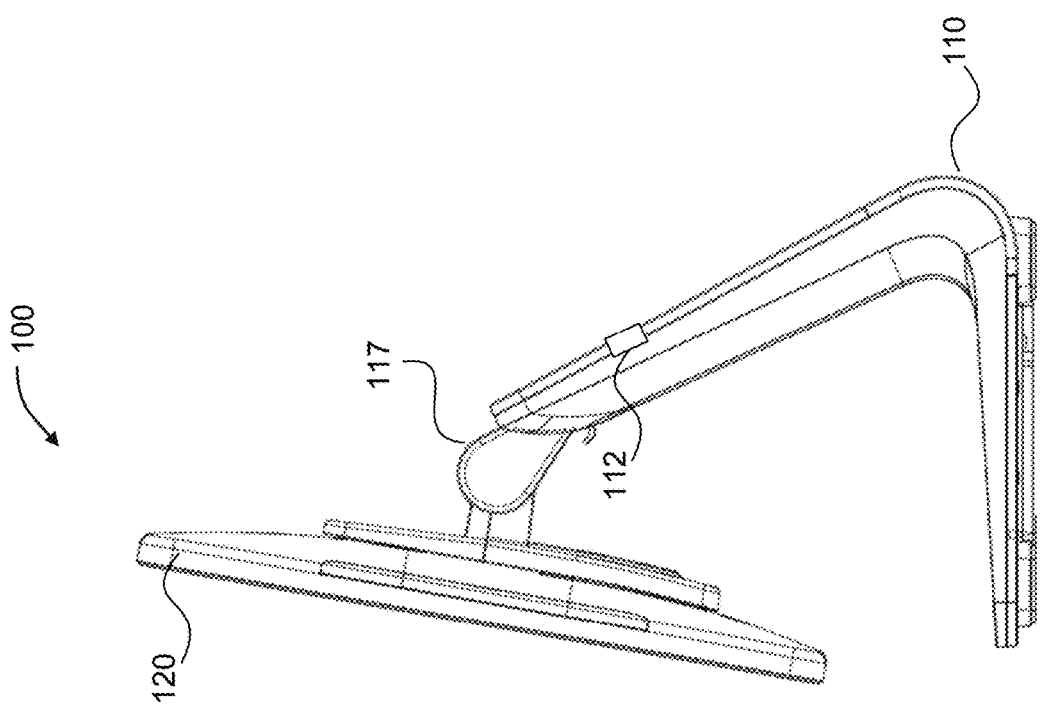
FIG. 1A illustrates a stand with a dual purpose RJ12 interface and a main display, according to an exemplary embodiment of the disclosure.

FIG. 1A illustrates example 100 including stand 110 with dual purpose RJ12 interface 112, and main display device 120, according to an exemplary embodiment of the disclosure. In example 100, main display device 120 can be a touchscreen device including but not limited to a tablet, a computer, an interactive display sign, and/or a mobile communication device. Main display device 120 may be facing a cashier that processes a point of sale (POS) transaction, for example. In an embodiment, dual purpose RJ12 interface 112 can be located within stand 110 as described further in FIG. 7. Using dual purpose RJ12 interface 112, stand 110 can utilize a software switch to enable communications with a cash drawer device (e.g., a cash register) or an RS232 device that transmits and receives a serial data transmission. Stand 110 also includes hinge structure 117 coupled to a thin L-shaped stand, where hinge structure 117 enables main display device 120 to operate in a flipped configuration. In some embodiments, stand 110 can be a flip stand.

FIG. 1B illustrates example 150 with stand 110 with dual purpose RJ12 interface 112, and main display device 120 in a flipped configuration, according to an exemplary embodiment of the disclosure. In example 150, main display device 120 can be flipped to an opposite direction to face a customer, for example. Thus, single main display device 120 being able to flip in the opposing direction may be a convenient and/or cost effective solution for POS transactions. Hinge structure 117 substantially covers and protects the cables that connect main display device 120 with stand 110, even as main display device 120 tilts in an opposing direction. For example, main display device 120 may tilt from a vertical position where the touchscreen is facing a seller parallel to a y-axis, and may tilt with a tilt angle 115, θ, where θ can be less than or equal to 152°, where main display device 120 faces a customer.

Figure 2:
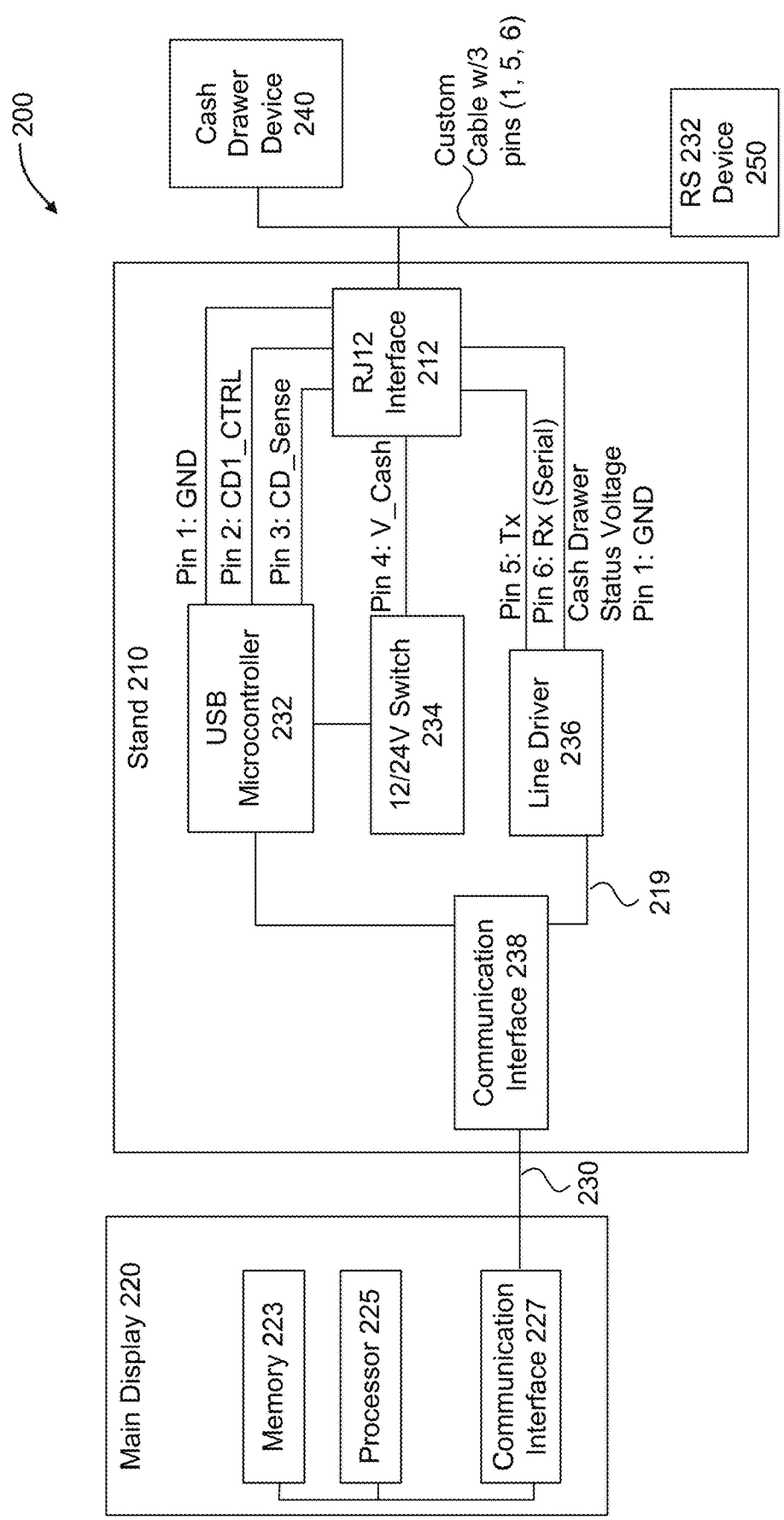
FIG. 2 illustrates a block diagram of a stand with a dual purpose RJ12 interface, according to an exemplary embodiment of the disclosure.

FIG. 2 illustrates block diagram 200 of stand 210 with dual purpose RJ12 interface 212, according to an exemplary embodiment of the disclosure. As a convenience and not a limitation, FIG. 2 may be described with elements corresponding to other figures in the disclosure. For example, main display device 220, stand 210, and dual purpose RJ12 interface 212 may correspond to main display device 120, stand 110, and dual purpose RJ12 interface 112 of FIG. 1. Main display device 220 may include memory 223, processor 225, and communication interface 227. As an example and not a limitation, main display device 220 may be computer system 1000 as described below in FIG. 10. Main display device 220 may use communication interface 227 and connection 230 to communicate with stand 210 via communication interface 238 (e.g., a USB type C interface). For example, the communication may be via a software application running on main display 220 transmitted or a command transmitted by main display 220 to stand 210. Stand 210 may include USB microcontroller 232 (e.g., WT58F165), 12V/24V switch 234 (e.g., MP2395GQ), line driver 236 (e.g., (MAX3222IPWR), and dual purpose RJ12 interface 212. Communication interface 238 may be coupled to USB microcontroller 232. In addition, communication interface 238 may be coupled to line driver 236 via connection 219. In some embodiments, connection 219 may include one or more USB hubs and/or a USB to universal asynchronous receiver and transmitter (UART) circuit (e.g., a USB3.0 hub coupled to a USB2.0 hub coupled to an XR21B1422 integrated circuit (IC).) Stand 210 may be coupled to cash drawer device 240 or to RS232 device 250. Some embodiments include a device with a single dual purpose RJ12 interface, in addition to other interface types. The single dual purpose RJ12 interface may be communicatively coupled to electronics (e.g., in a hub) that support communications using RS232 serial communications or cash drawer communications.

Figure 3:
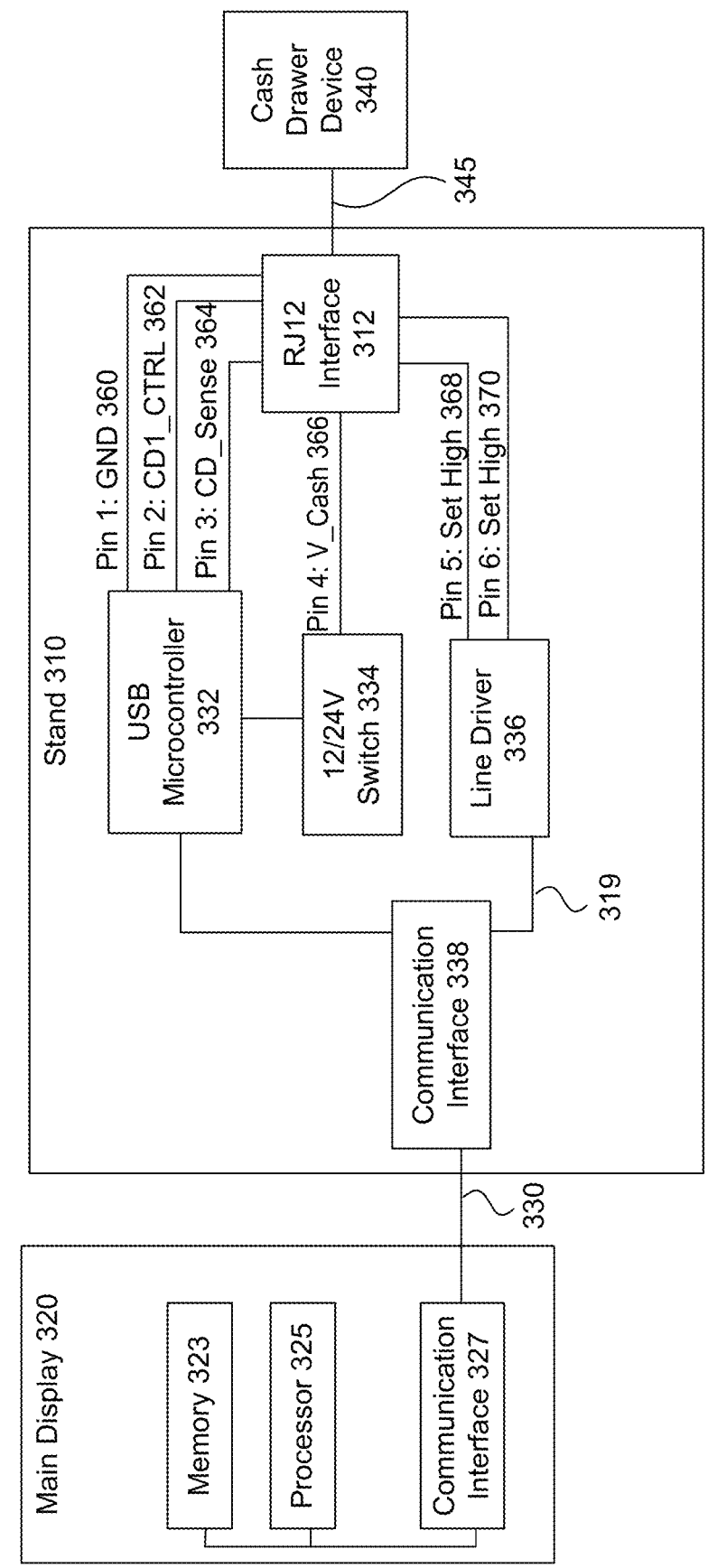
FIG. 3 illustrates a block diagram of a stand with a dual purpose RJ12 interface supporting a cash drawer device, according to an exemplary embodiment of the disclosure.

FIG. 3 illustrates block diagram 300 of stand 310 with dual purpose RJ12 interface 312 supporting cash drawer device 340, according to an exemplary embodiment of the disclosure. As a convenience and not a limitation, FIG. 3 may be described with elements corresponding to other figures in the disclosure. For example, main display device 320, stand 310, dual purpose RJ12 interface 312, connection 330, and connection 319 may correspond to main display device 220, stand 210, dual purpose RJ12 interface 212, connection 230, and connection 219 of FIG. 2. Thus, memory 323, processor 325, and communication interface 327 may correspond to memory 223, processor 225, and communication interface 227 of FIG. 2.

As an example, main display device 320 can transmit a signal to stand 310 via connection 330. The signal may be received at communication interface 338 and a corresponding signal may be transmitted to USB microcontroller 332. In response to the signal, another corresponding signal may be transmitted from communication interface 338 via connection 319 to line driver 336. Based on the corresponding signal received, USB microcontroller may set values for pins 1-3 for dual purpose RJ12 interface 312 as follows: Pin 1: GND 360, Pin 2: CD1_CTRL 362, and Pin 3: CD_Sense 364. USB Microcontroller 332 may transmit a signal to 12V/24V switch 334 that in turn sets pin 4 of dual purpose RJ12 interface 312 as follows: Pin 4: V Cash 366. In response to the other corresponding signal received via connection 319, line driver 336 may set pins 5 and 6 as follows: Pin 5: Set High 368 and Pin 6: Set High 370.

Subsequently, stand 310 may connect with and exchange information with cash drawer device 340 via connection 345 at dual purpose RJ12 interface 312. For example, an application running on main display device 320 can transmit and receive cash drawer mode communications via stand 310 and RJ 312 to cash drawer device 340. Cash drawer device 340 can also transmit and receive cash drawer mode communications via dual purpose RJ12 interface 312 and stand 310 that can be presented on main display device 320.

Figure 4:
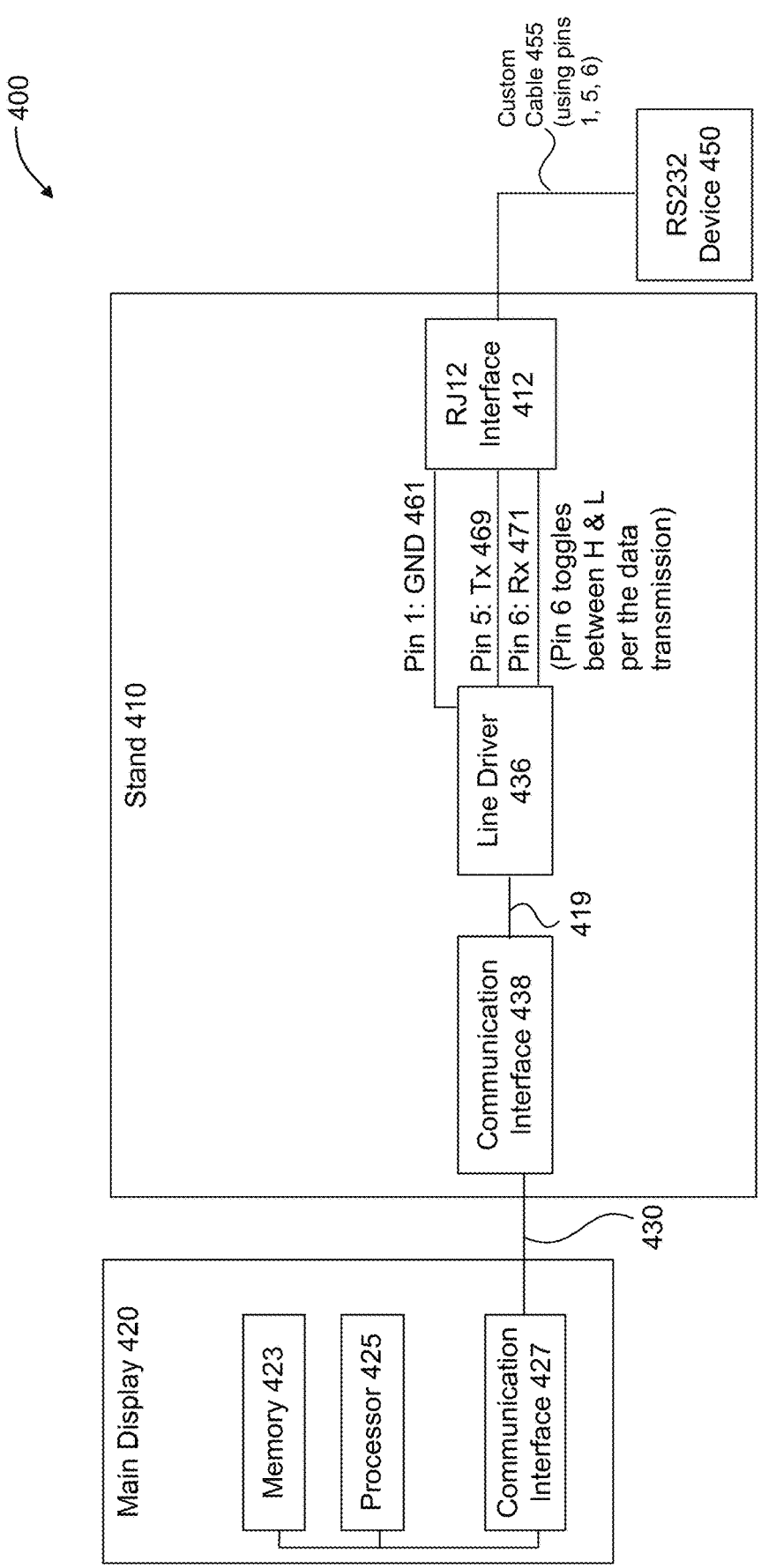
FIG. 4 illustrates a block diagram of a stand with a dual purpose RJ12 interface supporting an RS232 device, according to an exemplary embodiment of the disclosure.

FIG. 4 illustrates block diagram 400 of stand 410 with dual purpose RJ12 interface 412 supporting RS232 device 450, according to an exemplary embodiment of the disclosure. As a convenience and not a limitation, FIG. 4 may be described with elements corresponding to other figures in the disclosure. For example, main display device 420, stand 410, dual purpose RJ12 interface 412, connection 430, and connection 419 may correspond to main display device 220, stand 210, dual purpose RJ12 interface 212, connection 230, and connection 219 of FIG. 2. Thus, memory 423, processor 425, and communication interface 427 may correspond to memory 223, processor 225, and communication interface 227 of FIG. 2.

As an example, main display device 420 can transmit a signal to stand 410 via connection 430. The signal may be received at communication interface 438 and a corresponding signal may be transmitted via connection 419 to line driver 436. In some embodiments, connection 419 may include one or more USB hubs and/or a USB to universal asynchronous receiver and transmitter (UART) circuit (e.g., a USB3.0 hub coupled to a USB2.0 hub coupled to an XR21B1422 integrated circuit (IC). The UART circuit may enable RS232 mode communications.) Based on the corresponding signal received, line driver 436 may set pins 1, 5, and 6 as follows: Pin 1: ground (GND) 461, Pin 5: transmit (Tx) 469, and Pin 6: receive (Rx) 471. Thus, pin 6 toggles between high and low according to the data transmitted. Accordingly, stand 410 may connect with and exchange signals (e.g., information) with RS232 device 450 via connection 445 at dual purpose RJ12 interface 412. For example, an application running on main display 320 can transmit and receive serial communications via stand 410 and RJ 412 to RS232 device 450. RS232 device 450 can also transmit and receive RS232 mode communications via dual purpose RJ12 interface 412 and stand 410 that can be presented on main display device 420. In some embodiments, connection 455 is a custom cable that utilizes pins 1, 5, and 6. This is in contrast to a standard RJ12 interface to RS232 cable that utilizes pins 1, 2, and 3 with the corresponding values: GND, Tx, and Rx.

Figure 5:
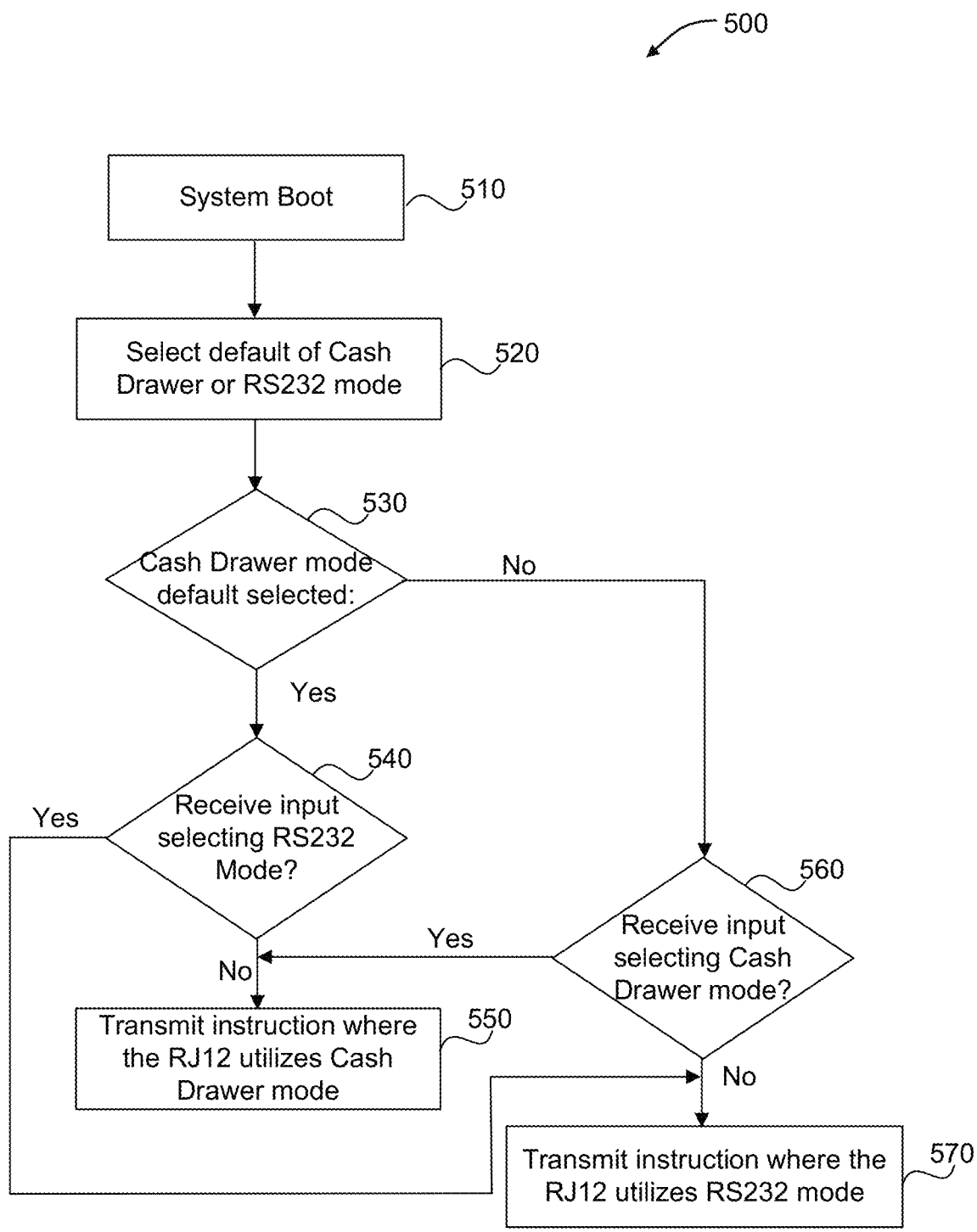
FIG. 5 illustrates a method for a main display, according to an exemplary embodiment of the disclosure.

FIG. 5 illustrates method 500 for a main display device, according to an exemplary embodiment of the disclosure. As a convenience and not a limitation, FIG. 5 may be described with elements corresponding to other figures in the disclosure. For example, method 500 may be performed by main display device 120 of FIG. 1, main display device 220 of FIG. 2, main display device 320 of FIG. 3, or main display device 420 of FIG. 4. For convenience and not a limitation, method 500 is described with regard to main display device 220.

At 510, main display device 220 performs a system boot.

At 520, main display device 220 selects a default of either cash drawer mode or RS232 mode.

At 530, main display device 220 determines whether the default mode is the cash drawer mode. When the cash drawer mode is the default selected, then method 500 proceeds to 540. Otherwise, method 500 proceeds to 560.

At 540, main display device 220 determines whether input has been received selecting a RS232 mode. For example, a graphical user interface (GUI) on main display device 220 may have received a selection input from a user choosing RS232 mode. Thus, even though the default mode is the cash drawer mode, a user can select a change to the RS232 mode via an input selection on the GUI. When the RS232 mode is selected, method 500 proceeds to 570. Otherwise, method 500 proceeds to 550.

AT 550, main display device 220 transmits instructions (e.g., via a USB signal) to stand 210. Stand 210 then configures dual purpose RJ12 interface 212 to utilize the cash drawer mode to enable main display device 220 to communicate with cash drawer device 240. Returning to 560 where the cash drawer mode is not selected as the default mode. In other words, RS232 mode is selected as the default mode. Main display device 220 determines whether input has been received selecting the cash drawer mode. For example, a GUI on main display device 220 may have received a selection input from a user choosing the cash drawer mode. Thus, even though the default mode is the RS232 mode, a user can select a change to the cash drawer mode via an input selection on the GUI. When an input selection of cash drawer mode is received, method 500 returns to 550. Otherwise, method 500 proceeds to 570.

At 570, main display device 220 transmits instructions (e.g., via a USB signal) to stand 210. Stand 210 can configure dual purpose RJ12 interface 212 to utilize the RS232 mode to communicate with RS232 device 250.

Figure 6:
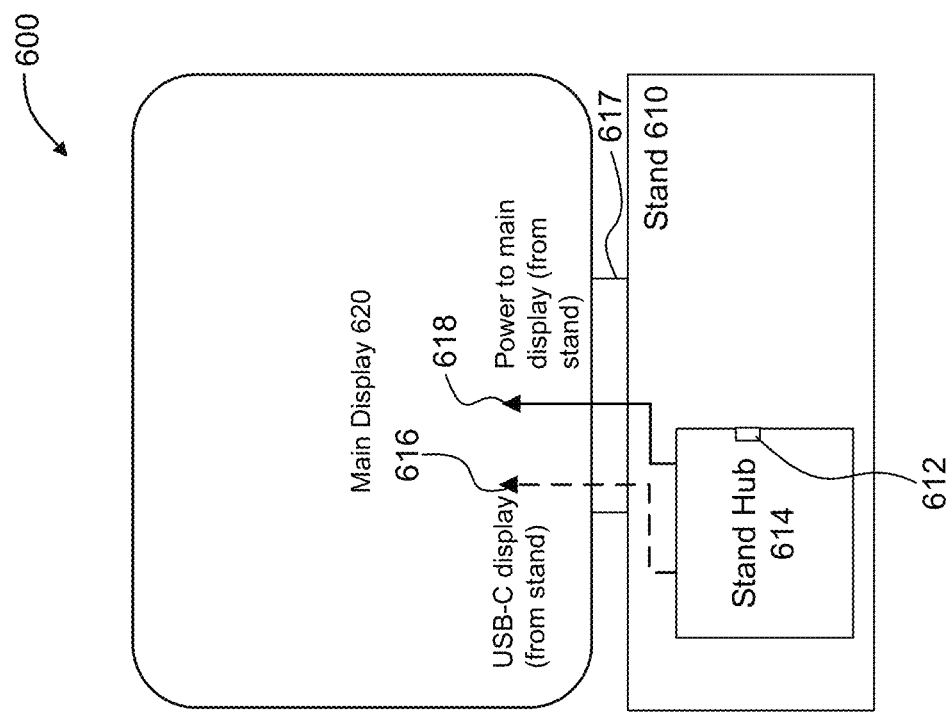
FIG. 6 illustrates cable routes through a hinge structure of a stand, according to an exemplary embodiment of the disclosure.

FIG. 6 illustrates example 600 with cable routes through hinge structure 617 of stand 610, according to an exemplary embodiment of the disclosure. As a convenience and not a limitation, FIG. 6 may be described with elements corresponding to other figures in the disclosure. For example, main display device 620, stand 610, dual purpose RJ12 interface 612, and hinge structure 617 may be substantially the same as main display device 120, stand 110, dual purpose RJ12 interface 112, and hinge structure 117 of FIG. 1. USB-C cable 616 may correspond to connection 230 of FIG. 2, connection 330 of FIG. 3, and/or connection 430 of FIG. 4. Although not shown in FIGS. 2-4 above, power cable 618 provides power (e.g., DC power) between corresponding main display devices and stands.

Stand 610 may also include stand hub 614 that includes dual purpose RJ12 interface 612. USB-C cable 616 and power cable 618 may be coupled from stand 610 to main display device 620, where USB-C cable 616 and power cable 618 are substantially concealed within hinge structure 617. USB-C cable 616 and power cable 618 are also protected by hinge structure 617 that provides a gentle cable bending radius near the axis of rotation to avoid wear (e.g., prevent friction, material fatigue, and/or excessive stresses). As an example, USB-C cable 616 and/or power cable 618 are long enough to enable corresponding tilt angle 115, θ, of FIG. 1B, or in other words, enable main display device 120 to flip to an opposite direction. In some examples, USB-C cable 616 and/or power cable 618 may be up to 12 inches (e.g., 320 mm) in length. In some embodiments, the length of USB-C cable 616 and/or power cable 618 vary according to a VESA bracket dimension, a geometry of main display device 120 (e.g., a size of a touchscreen display of main display device 120 such as 15.6 inch), and/or a geometry of a customer display device.

Figure 7:
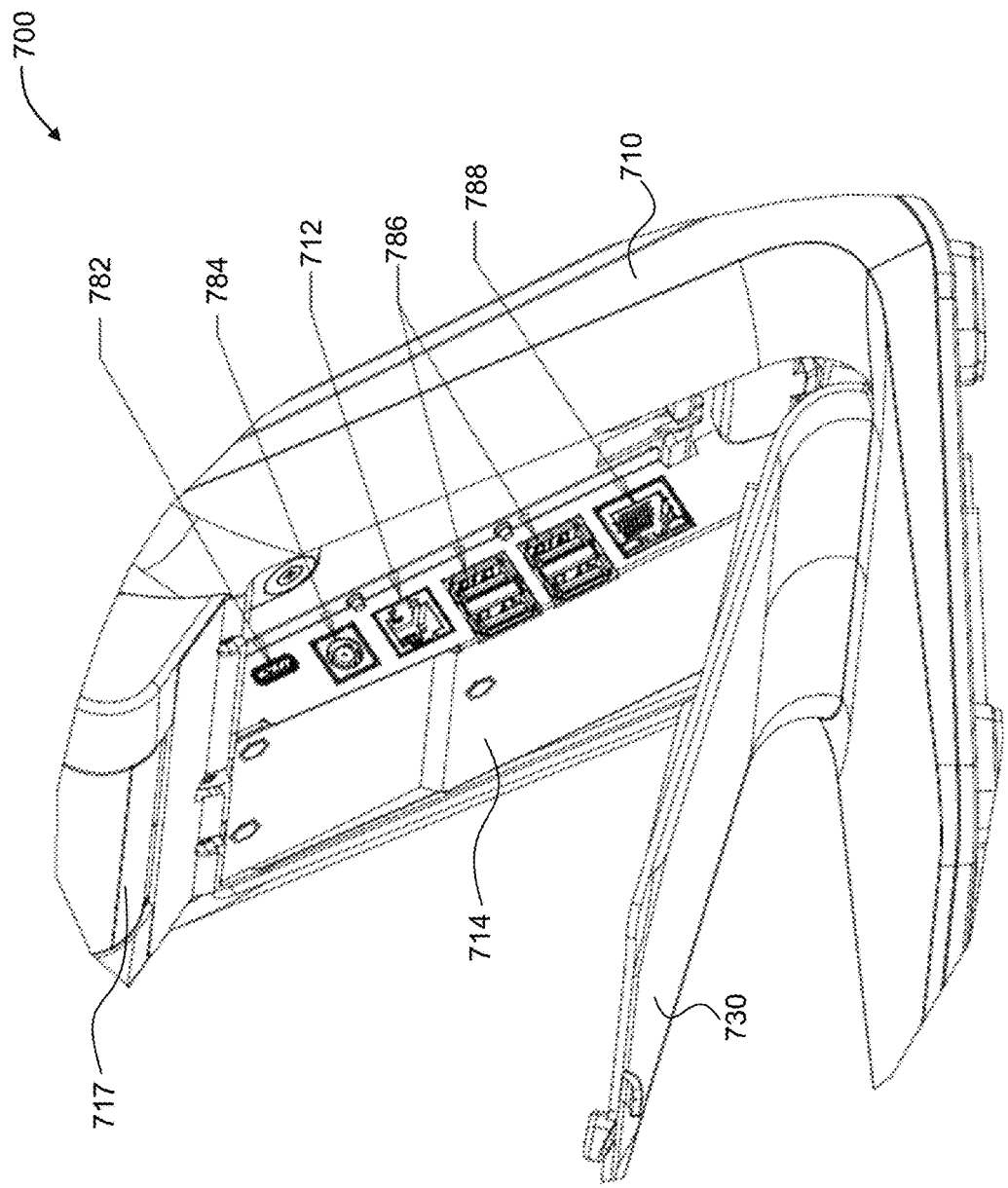
FIG. 7 illustrates a stand hub with a dual purpose RJ12 interface, according to an exemplary embodiment of the disclosure.

FIG. 7 illustrates example 700 of stand hub 714 with dual purpose RJ12 interface 712, according to an exemplary embodiment of the disclosure. As a convenience and not a limitation, FIG. 7 may be described with elements corresponding to other figures in the disclosure. For example, stand 710, dual purpose RJ12 interface 712, hinge structure 717, and stand hub 714 may be the same as stand 610, dual purpose RJ12 interface 612, hinge structure 617, and stand hub 614 of FIG. 6. Stand hub 714 can include USB-C port 782 supporting a customer facing device (not shown; see FIGS. 8A-8C below), power port 784 supporting the customer facing device, multiple USB ports 786 (e.g., 4 USB-A ports), and Ethernet port 788 supporting connection to a local area network (LAN), and corresponding electronics. Stand 710 may also include a hub and cabling cover 730. Hinge structure 717 can conceal power cable 618 and USB-C cable 616 of FIG. 6 for connecting to main display device 120 of FIG. 1, for example. Stand 710 also includes corresponding electronics (not shown) of power cable 618 and USB-C cable 616. In some embodiments, power cable 618 and USB-C cable 616 can be routed through a VESA mounting plate (not shown) while providing gentle cable bending radius near the axis of rotation to minimize wear. An example of the bending radius of hinge structure 717 is illustrated with hinge structure 117 and corresponding tilt angle 115, θ, is shown in FIG. 1B. In some examples, external customer facing device cables (e.g., cables coupled to USB-C port 782 and/or power port 784) as well as peripheral cables may be routed through the base of stand 710.

Example 700 illustrates that stand 710 includes electronics and functions beyond that of a mechanical device. Further, example 700 illustrates the thinness of the L-shaped stand of stand 710 stand in spite of the functionality provided with a compact height. In some embodiments, dimensions of stand 710 may be 7.6 inch×10.0 inch×6.7 inch (194 mm×255 mm×169 mm.)

FIG. 8A illustrates example 800 of stand 810 with dual purpose RJ12 interface 812 with main display device 820 and customer display device 830A, according to an exemplary embodiment of the disclosure. As a convenience and not a limitation, FIGS. 8A-8C may be described with elements corresponding to other figures in the disclosure. For example, main display device 820, stand 810, dual purpose RJ12 interface 812, and hinge structure 817 may be the same as main display device 120, stand 110, dual purpose RJ12 interface 112, and hinge structure 117 of FIG. 1. As shown in FIGS. 8A-8C, stand 810 includes a compact mounting of customer facing display 830A-830C at a comfortable angle. As an example, the angle is shown as 62 degrees. In some embodiments, the angle may be between 50 and 70 degrees.

Examples 800, 840, and 870 illustrate various geometry (e.g., sizes) of customer display devices 830A, 830B, and 830C. Based on the relative sizes of main display device 820 and corresponding customer display device 830A, 830B, and 830C, main display device 820 can tilt to a different maximum tilt angle, θ 815. Each of example 800, 840, and 870 can include main display device 820 with a 15.6 inch diagonal touchscreen. Customer display device 830A can include for example, a 10 inch diagonal touchscreen affixed to stand 810 where main display device 820 can flip to position 820A with a tilt angle 815A, θ, where θ can be less than or equal to 83°. For example, when a ratio of main display device 820 to customer display device 830A is approximately 1.6 (e.g., 15.6 inch/10.0 inch=1.56) then tilt angle 815A, θ, can have a maximum value of approximately 83°.

FIG. 8B illustrates example 840 of stand 810 with dual purpose RJ12 interface 812 with main display device 820 and customer display device 830B, according to an exemplary embodiment of the disclosure. Customer display device 830B can include for example, a 13 inch diagonal touchscreen affixed to stand 810 where main display device 820 can flip to position 820B with a tilt angle 815B, θ, where θ can be less than or equal to 70°. For example, when a ratio of main display device 820 to customer display device 830B is approximately 1.2 (e.g., 15.6 inch/13.0 inch=1.6) then tilt angle 815B, θ, can have a maximum value of approximately 70°.

FIG. 8C illustrates example 870 of stand 810 with dual purpose RJ12 interface 812 with main display device 820 and customer display device 830C, according to an exemplary embodiment of the disclosure. Customer display device 830C can include for example, a 15 inch diagonal touchscreen affixed to stand 810 where main display device 820 can flip to position 820C with a tilt angle 815C, θ, where θ can be less than or equal to 43°. For example, when a ratio of main display device 820 to customer display device 830C is approximately 1.0 (e.g., 15.6 inch/15.0 inch=1.0) then tilt angle 815C, θ, can have a maximum value of approximately 43°.

Figure 9A:
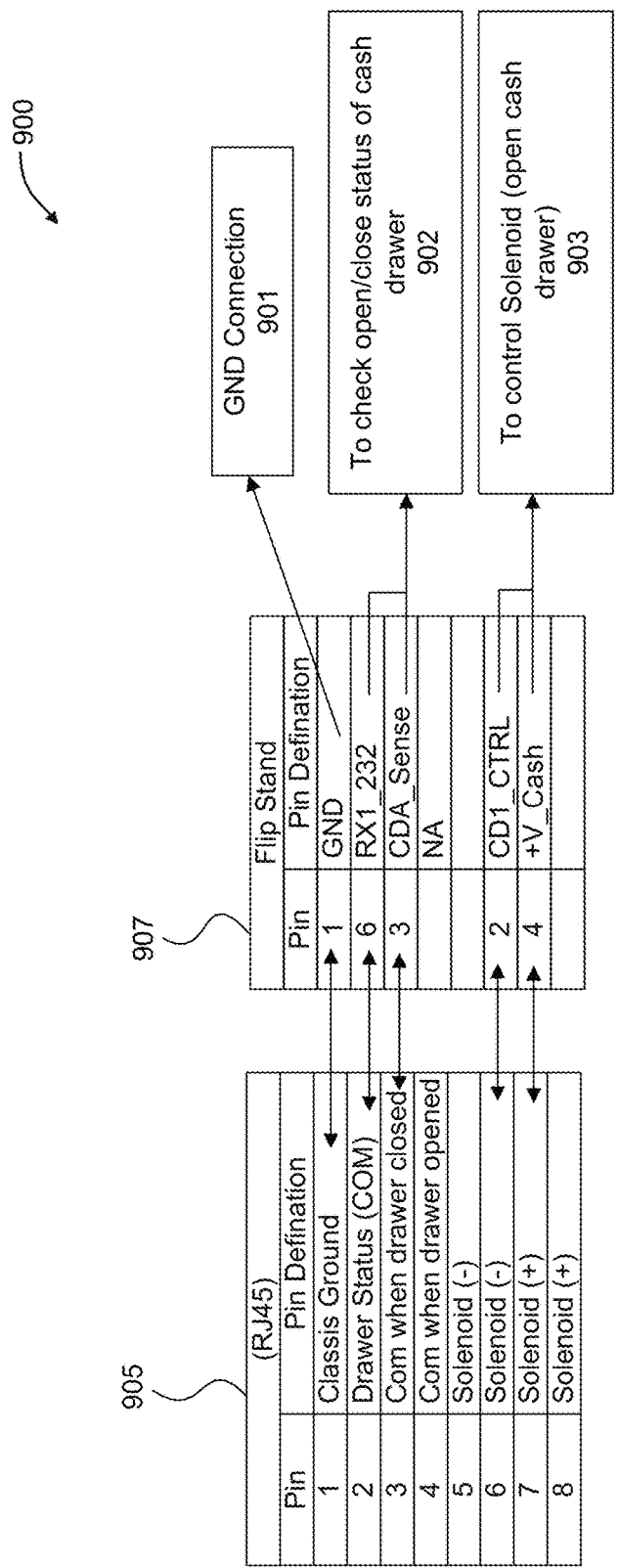
FIG. 9A illustrates an example of a pinout of a dual purpose RJ12 interface of a stand supporting a cash drawer device, according to an exemplary embodiment of the disclosure.

FIG. 9A illustrates example 900 of pinout of a dual purpose RJ12 interface of a stand supporting a cash drawer device, according to an exemplary embodiment of the disclosure. As a convenience and not a limitation, FIG. 9A may be described with elements corresponding to other figures in the disclosure. For example, example 900 may illustrate the pins corresponding to pins at the ends of connection 345 of FIG. 3, where RJ45 905 corresponds to pins of cash drawer device 340 of FIG. 3 and Stand 907 corresponds to pins of dual purpose RJ12 interface 312 of FIG. 3. GND connection 901 illustrates ground corresponding to pin 1, status of cash drawer 902 corresponds to a combination of pins 3 and 6, and solenoid control 903 corresponds to pins 2 and 4. Accordingly, pins 3 and 6 can be used to convey the open/close status of a cash drawer of cash drawer device 340. As described in FIG. 3, pin 6 is set to high. As an example, when cash drawer device 340 detects that pin 3 is set to high (H), the cash drawer of cash drawer device 340 is confirmed as closed. Conversely, when cash drawer device 340 detects that pin 3 is set to low (L), the cash drawer of cash drawer device 340 is confirmed to be open.

Figure 9B:
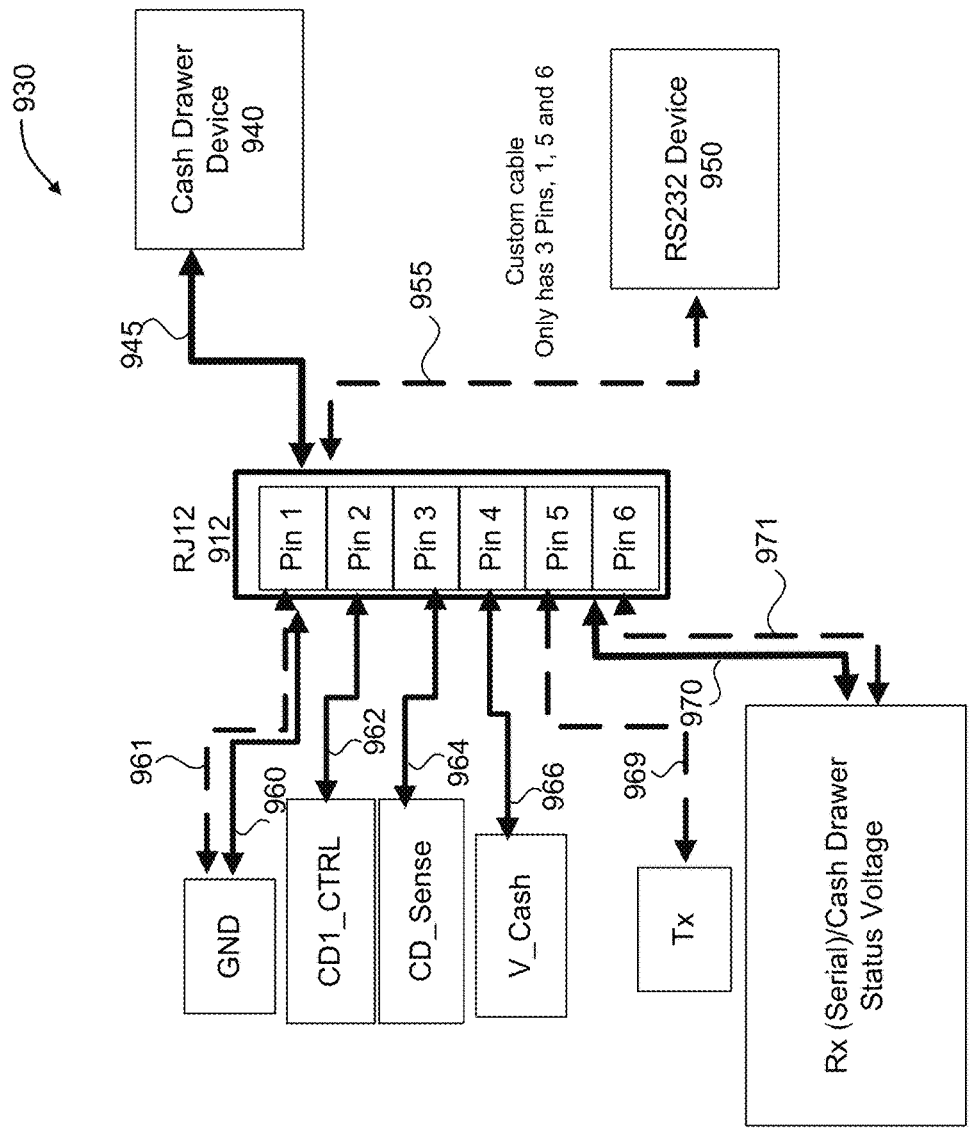
FIG. 9B illustrates a pinout of a dual purpose RJ12 interface of a stand supporting a cash drawer device and a RS232 device according to an exemplary embodiment of the disclosure.

FIG. 9B illustrates example 930 of a pinout of dual purpose RJ12 interface 912 of a stand supporting cash drawer device 940 or RS232 device 950 according to an exemplary embodiment of the disclosure. As a convenience and not a limitation, FIG. 9B may be described with elements corresponding to other figures in the disclosure. For example, the solid lines may correspond to pins of example 300 of FIG. 3, and the dashed lines may correspond to pins of example 400 of FIG. 4. For example, cash drawer device 940, connection 945, Pin 1: GND 960, Pin 2: CD1_CTRL 962, Pin 3: CD_Sense 964, Pin 4: V Cash 966, Pin 5: Set High 968 and Pin 6: Set High 970 may correspond to cash drawer device 340, connection 345, Pin 1: GND 360, Pin 2: CD1_CTRL 362, Pin 3: CD_Sense 364, Pin 4: V Cash 366, Pin 5: Set High 368, and Pin 6: Set High 370 of FIG. 3. In some embodiments, for cash drawer mode communications, pin 5 of dual purpose RJ12 interface 912 is not connected with cash drawer device 940 as a corresponding cable for connection 945 does not include a trace. In FIG. 9B, the solid and dashed lines drawn to the left of RJ12 connector 912 represent single conductor traces on a circuit board corresponding to pins of dual purpose RJ12 interface 912. The solid and dashed lines labeled connection 945 and connection 955 represent examples of multi-conductor cables that can connect to dual purpose RJ12 interface 912 (e.g., connection 945 and connection 955 do not represent a pin-specific illustration.)

Further, RS232 device 950, connection 955, and the pins corresponding to the dashed lines in example 930, namely, Pin 1: ground (GND) 961, Pin 5: transmit (Tx) 969, and Pin 6: receive (Rx) 971 may correspond to RS232 device 450, connection 455, Pin 1: ground (GND) 461, Pin 5: transmit (Tx) 469, and Pin 6: receive (Rx) 471 of FIG. 4. In contrast to the solid line of Pin 6: Set High 970 for communications with cash drawer device 940, a value of Pin 6: receive (Rx) 971 toggles between high and low according to the data transmitted for communications with RS232 device 950.

Figure 9C:
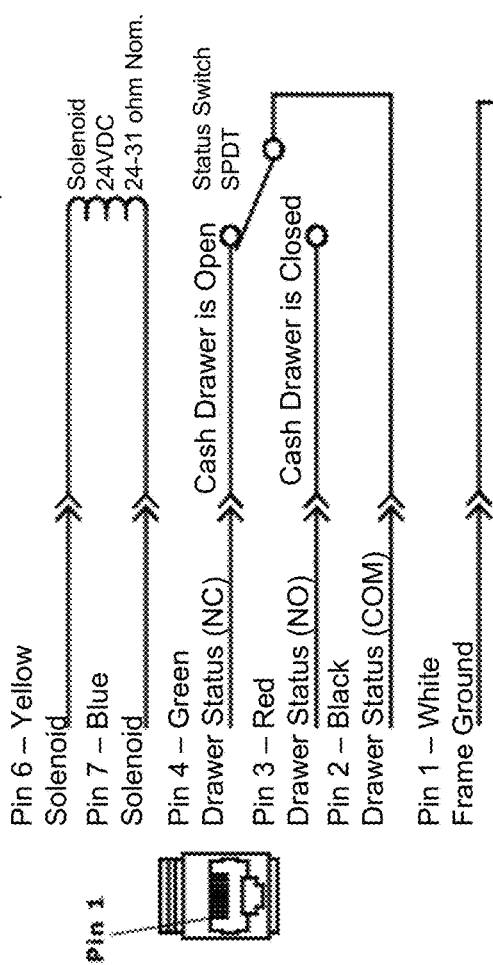
FIG. 9C illustrates an example of a cable connecting a dual purpose RJ12 interface to a cash drawer device, according to an exemplary embodiment of the disclosure.

FIG. 9C illustrates example 970 of a cable connecting dual purpose RJ12 interface 912 to cash drawer device 940, according to an exemplary embodiment of the disclosure. As a convenience and not a limitation, FIG. 9C may be described with elements corresponding to other figures in the disclosure. For example, example 970 may correspond to pins corresponding to an RJ45 interface of cash drawer device 940 of FIG. 9B. As described in FIG. 9A, status of cash drawer 902 corresponds to a combination of pins 3 and 6 of dual purpose RJ12 interface 912 of FIG. 9B. Thus, pins 3 and 6 of dual purpose RJ12 interface 912 can convey cash drawer status between main display device 320 of FIG. 3 and cash drawer device 940. As shown in example 970, Status Switch single-pole double throw switch (SPDT) of cash drawer device 940 can be used to notify main display device 320 of the status of the cash drawer.

Figure 10:
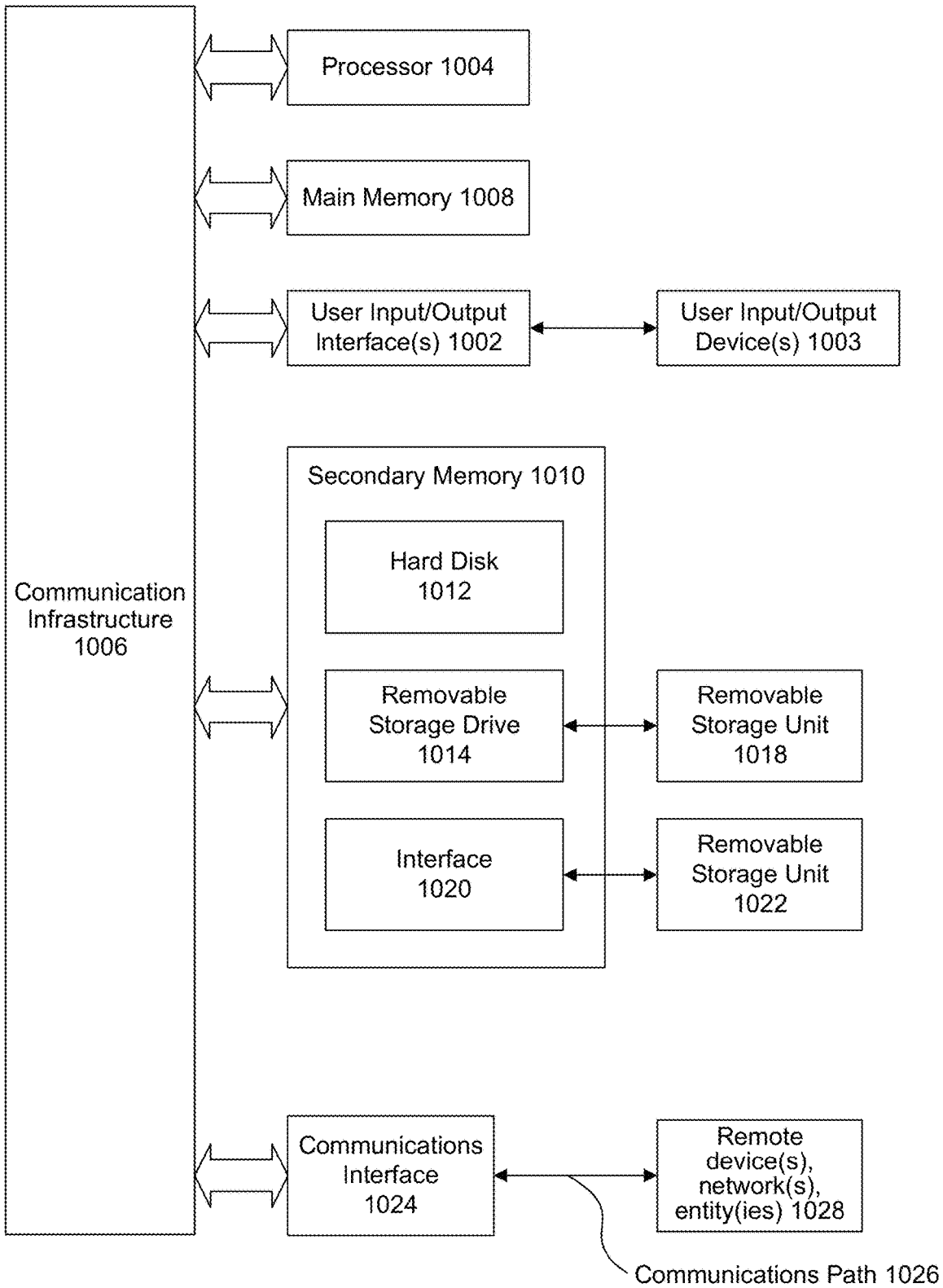
FIG. 10 illustrates an example computer system useful for implementing and/or using various embodiments.

Various embodiments can be implemented, for example, using one or more well-known computer systems, such as computer system 1000 shown in FIG. 10. Computer system 1000 can be any well-known computer capable of performing the functions described herein such as main display device 120, 220, 320, 420, 620, and 820 of FIGS. 1-4, 6, and 8, or customer display device 830A-830C of FIG. 8. Computer system 1000 may be internal or external to any main display device and/or any customer display device as discussed above. For example, portions of computer system 1000 may be included as main display device, customer display device, and/or stand (e.g., stand 110, 210, 310, 410, 610, 710, 810 of FIGS. 1-4, and 6-8). In addition, any main display device, customer display device, and/or stand herein may be used in conjunction with another computer system 1000. In an example, computer system 1000 may be used to perform method 500 of FIG. 5.

Computer system 1000 includes one or more processors (also called central processing units, or CPUs), such as a processor 1004. Processor 1004 is connected to a communication infrastructure or bus 1006. One or more processors 1004 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc. Computer system 1000 also includes user input/output device(s) such as monitors, keyboards, pointing devices, etc., that communicate with communication infrastructure 1006 through user input/output interface(s) 1002 that may be coupled to user input/output device(s) 1003.

Computer system 1000 also includes a main or primary memory 1008, such as random access memory (RAM). Main memory 908 may include one or more levels of cache. Main memory 1008 has stored therein control logic (i.e., computer software) and/or data. Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to an exemplary embodiment, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired, and/or wireless, and which may include any combination of LANs, WANs, the Internet, etc. Control logic and/or data may be transmitted to and from computer system 1000 via communication path 1026.

In an embodiment, a tangible, non-transitory apparatus or article of manufacture comprising a tangible computer useable or readable medium having control logic (software) stored thereon is also referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), causes such data processing devices to operate as described herein.

The foregoing description, for purposes of explanation, used specific nomenclature to provide a thorough understanding of the disclosure. However, it will be apparent to one skilled in the art that specific details are not required in order to practice the disclosure. Thus, the foregoing descriptions of specific embodiments of the disclosure are presented for purposes of illustration and description. They are not intended to be exhaustive or to limit the disclosure to the precise forms disclosed; obviously, many modifications and variations are possible in view of the above teachings. The embodiments were chosen and described in order to best explain the principles of the disclosure and its practical applications, they thereby enable others skilled in the art to best utilize the disclosure and various embodiments with various modifications as are suited to the particular use contemplated. It is intended that the following claims and their equivalents define the scope of the disclosure.

Based on the teachings contained in this disclosure, it will be apparent to persons skilled in the relevant art(s) how to make and use embodiments of the disclosure using data processing devices, computer systems and/or computer architectures other than that shown in FIG. 10. In particular, embodiments may operate with software, hardware, and/or operating system implementations other than those described herein.

It is to be appreciated that the Detailed Description section, and not the Abstract section, is intended to be used to interpret the claims. The Abstract section may set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus the disclosure should not be limited by any of the above-described exemplary embodiments. Further, the claims should be defined only in accordance with their recitations and their equivalents.

What is claimed is:

1. A system comprising:
   a stand comprising one dual purpose RJ12 interface configured to switch between a cash drawer mode and an RS232 mode, wherein the stand is configured to be coupled to a main display device, wherein the main display device comprises:
   a memory; and
   a processor coupled to the memory, wherein the processor is configured to:
     select the cash drawer mode for communications via the dual purpose RJ12 interface;
     receive an input signal after the selection;
     select the RS232 mode for communications via the dual purpose RJ12 interface based on the input signal; and
     transmit an indication to the stand, wherein the dual purpose RJ12 interface is configured to operate in the RS232 mode.

2. The system of claim 1, wherein the stand further comprises a hinge structure that substantially conceals a universal serial bus (USB) cable and a power cable coupled to the main display device.

3. The system of claim 2, wherein the hinge structure enables the main display device to be flipped to face an opposite direction.

4. The system of claim 3, wherein the main display device is tilted at a tilt angle, θ, wherein θ is less than or equal to 152°.

5. The system of claim 2, wherein the main display device and a customer facing device coupled to the stand face opposite directions.

6. The system of claim 5, wherein the main display device and the customer facing device are of substantially equivalent sizes, and the hinge structure enables the main display device to be tilted at a tilt angle, θ, wherein θ is less than or equal to 43°.

7. The system of claim 5, wherein a display of the main display device is approximately 1.2 times that of a customer facing display of the customer facing device, and the hinge structure enables the main display device to be tilted at a tilt angle, θ, wherein θ is less than or equal to 70°.

8. The system of claim 5, wherein a display of the main display device is approximately 1.6 times that of a customer facing display of the customer facing device, and the hinge structure enables the main display device to be tilted at a tilt angle, θ, wherein θ is less than or equal to 83°.

9. The system of claim 2, wherein the power cable or the USB cable is at least 12 inches long.

10. The system of claim 2, wherein a length of the power cable or the USB cable varies according to a geometry of the main display device.

11. A method for a main display device comprising:
    selecting an RS232 mode for communications via a stand comprising one dual purpose RJ12 interface, wherein the dual purpose RJ12 interface is configured to switch between a cash drawer mode and the RS232 mode;
    receiving an input signal after the selection;
    selecting the cash drawer mode for communications via the dual purpose RJ12 interface based on the input signal; and
    transmitting an indication to the stand, wherein the dual purpose RJ12 interface is configured to operate in the cash drawer mode.

12. The method of claim 11, wherein the stand comprises a hinge structure that substantially conceals a universal serial bus (USB) cable and a power cable coupled to the main display device.

13. The method of claim 12, wherein the power cable or the USB cable is at least 12 inches long.

14. The method of claim 12, wherein a length of the power cable or the USB cable varies according to a geometry of the main display device.

15. The method of claim 12, wherein the hinge structure enables the main display device to be flipped to face an opposite direction, wherein the main display device is tilted at a tilt angle, θ, wherein θ is less than or equal to 152°.

16. The method of claim 12, wherein the main display device and a customer facing device coupled to the stand face opposite directions.

17. The method of claim 16, wherein the main display device and the customer facing device are of substantially equivalent sizes, and the hinge structure enables the main display device to be tilted at a tilt angle, θ, wherein θ is less than or equal to 43°.

18. The method of claim 16, wherein a display of the main display device is approximately 1.2 times a size of a customer facing display of the customer facing device, and the hinge structure enables the main display device to be tilted at a tilt angle, θ, wherein θ is less than or equal to 70°.

19. The method of claim 16, wherein a display of the main display device is approximately 1.6 times a size of a customer facing display of the customer facing device, and the hinge structure enables the main display device to be tilted at a tilt angle, θ, wherein θ is less than or equal to 83°.

20. The method of claim 11, wherein the receiving the input signal after the selection comprises receiving the input signal via a graphical user interface (GUI).

* * * * *